United States Patent [19]

Kaneko et al.

[11] Patent Number: 5,059,000

[45] Date of Patent: Oct. 22, 1991

[54] IMAGE FORMING MEDIUM AND IMAGE FORMING APPARATUS USING SAME

[75] Inventors: Shuzo Kaneko, Yokohama; Akihiro Mouri, Atsugi; Kazuo Isaka, Tokyo; Kazuo Yoshinaga, Machida; Toshikazu Ohnishi, Atsugi; Yomishi Toshida; Yutaka Kurabayashi, both of Yokohama; Takeo Eguchi, Atsugi, all of Japan

[73] Assignee: Canon Kabushiki Kaisha, Tokyo, Japan

[21] Appl. No.: 535,978

[22] Filed: Jun. 11, 1990

Related U.S. Application Data

[63] Continuation of Ser. No. 281,760, Dec. 9, 1988, abandoned.

[30] Foreign Application Priority Data

| Dec. 10, 1987 | [JP] | Japan | 62-310848 |
| Dec. 11, 1987 | [JP] | Japan | 62-312146 |
| Dec. 11, 1987 | [JP] | Japan | 62-312147 |
| Dec. 11, 1987 | [JP] | Japan | 62-312148 |
| Dec. 24, 1987 | [JP] | Japan | 62-325392 |
| Dec. 28, 1987 | [JP] | Japan | 62-329917 |
| Dec. 29, 1987 | [JP] | Japan | 62-336125 |

[51] Int. Cl.$^5$ ............... G02F 1/13; G09G 3/18; G01D 15/10

[52] U.S. Cl. ............... 350/351; /346; 350/339 F; 346/76 PH; 346/76 L; 359/68; 359/45; 359/90

[58] Field of Search ............... 350/351, 350 F, 346, 350/339 F, 350 R; 346/135.1, 76 L, 76 PH, 139 A; 428/913; 430/286, 945; 340/701; 365/108

[56] References Cited

U.S. PATENT DOCUMENTS

| 4,059,340 | 11/1977 | Kahn et al. | 350/350 R |
| 4,222,641 | 9/1980 | Stolov | 350/331 R |
| 4,232,951 | 11/1980 | Aharoni et al. | 350/351 X |
| 4,596,445 | 6/1986 | Fergason | 350/350 F X |
| 4,634,227 | 1/1987 | Nishimura et al. | 350/334 |
| 4,675,699 | 6/1987 | Kan et al. | 350/351 X |
| 4,693,557 | 9/1987 | Fergason | 350/334 |
| 4,702,558 | 10/1987 | Coles et al. | 350/351 X |
| 4,727,533 | 2/1988 | Erbert | 346/135.1 X |
| 4,734,359 | 3/1988 | Oguchi et al. | 430/945 |
| 4,765,720 | 8/1988 | Toyono et al. | 350/350 S |
| 4,777,492 | 10/1988 | Ohnishi et al. | 346/135.1 X |
| 4,786,148 | 11/1988 | Sekimura et al. | 350/339 F |
| 4,796,980 | 1/1989 | Kaneko et al. | 350/350 S |
| 4,822,143 | 4/1989 | Zondler | 350/350 R X |
| 4,827,334 | 5/1989 | Johnson et al. | 358/60 |
| 4,854,696 | 8/1989 | Guez | 355/77 |
| 4,920,374 | 4/1990 | Sangyoji et al. | 355/32 |
| 4,933,708 | 6/1990 | Asano et al. | 355/32 |

FOREIGN PATENT DOCUMENTS

| 0141150 | 11/1979 | Japan | 350/350 F |
| 0076528 | 5/1982 | Japan | . |

*Primary Examiner*—Stanley D. Miller
*Assistant Examiner*—Tai V. Duong
*Attorney, Agent, or Firm*—Fitzpatrick, Cella, Harper & Scinto

[57] ABSTRACT

An image forming medium is constituted by a laminate including at least an optical scattering layer and a backing member preferably comprising a pattened color filter. The laminate is composed to have an interface between the optical scattering layer and the backing member capable of reflecting light incident to the optical scattering layer. The optical scattering layer may comprise a polymer liquid crystal optionally containing a fluorescent agent or nucleating agent so as to enhance the optical scattering effect. The interface may be given by a low-refractive index layer, such as air layer. The optical scattering layer and the backing member can be separated and combined with an adjusting means for adjusting the relative position of the optical scattering layer and the backing member to provide an image forming apparatus.

10 Claims, 13 Drawing Sheets

IMAGE FORMING MEDIUM AND IMAGE FORMING APPARATUS USING SAME

This application is a continuation-in-part of application Ser. No. 281,760, filed Dec. 9, 1988, now abandoned.

FIELD OF THE INVENTION AND RELATED ART

The present invention relates to an image forming medium and an image forming apparatus using the medium for displaying an image depending on given image signals, particularly such an image forming apparatus capable of repetitive display or capable of forming a diversity of color images.

Hitherto, motion picture outputs of a television receiver or a VTR (video tape recorder) or outputs through conversational operation with a computer have been displayed on a display monitor such as a CRT (cathode ray tube) or a TN (twisted nematic)-type liquid crystal panel, while fine images such as characters or figures outputted from a word processor or a facsimile machine have been printed out on paper to provide a hard copy.

A CRT provides a beautiful image for a motion picture output but causes a degradation in observability due to flickering or scanning fringes because of insufficient resolution.

Further, a conventional liquid crystal display using a TN-liquid crystal as described above provides a thin apparatus but involves problems, such as troublesome steps including a step of sandwiching a liquid crystal between glass substrates and a darkness of a picture.

Further, the CRT and TN-liquid crystal panel do not have a stable image memory characteristic, so that it is necessary to always effect beam scanning or application of pixel voltages even for output of still images as described above.

On the other hand, a hard copy image outputted on paper can be obtained as a stable memory image, but frequent use thereof is accompanied with the necessity of a large space for filing, and the loss of resources caused by a large amount of disposal cannot be ignored.

U.S. Pat. No. 4,734,359 discloses a display apparatus wherein a specific medium causing a transition from a transparent state to an opaque state is utilized for display. However, the images obtained thereby do not necessarily have a high contrast or are not clear.

SUMMARY OF THE INVENTION

Accordingly, an object of the present invention is to provide an image forming apparatus capable of forming clear images of high contrast.

A further object of the present invention is to provide an image forming apparatus capable of displaying highly fine color images with a clarity comparable to that obtained by a hard copy and capable of repetitively displaying color images without deviation.

According to a first aspect of the present invention, there is provided an image forming medium comprising a laminate including at least an optical scattering layer and a backing member, said laminate having an interface between the optical scattering layer and the backing member capable of reflecting a light incident to said optical scattering layer. An image forming apparatus is further provided by combining the image forming medium with a writing means. In a preferred embodiment, the interface is formed by disposing an intermediate layer having a lower refractive index than the optical scattering layer between the optical scattering layer and the backing member.

According to another aspect of the present invention, there is provided an image forming apparatus comprising:
an image forming medium including an image forming layer comprising a polymer liquid crystal, and a patterned color filter;
a writing means for imagewise heating the image forming layer to form a written part thereon; and
an adjusting means for relatively moving said image forming medium and writing means for positional adjustment.

According to a further aspect of the present invention, there is provided an image forming apparatus comprising:
an image forming layer comprising a polymer liquid crystal;
a writing means for imagewise heating the image forming layer to form a written part thereon;
a display means for forming a contrast image by a combination of the image forming layer having the written part and a color filter; and
an adjusting means for relatively moving said image forming layer and writing means for positional adjustment.

These and other objects, features and advantages of the present invention will become more apparent upon a consideration of the following description of the preferred embodiments of the present invention taken in conjunction with the accompanying drawings, wherein like parts are denoted by like reference numerals.

DESCRIPTION OF THE PREFERRED EMBODIMENTS

Figure 1:
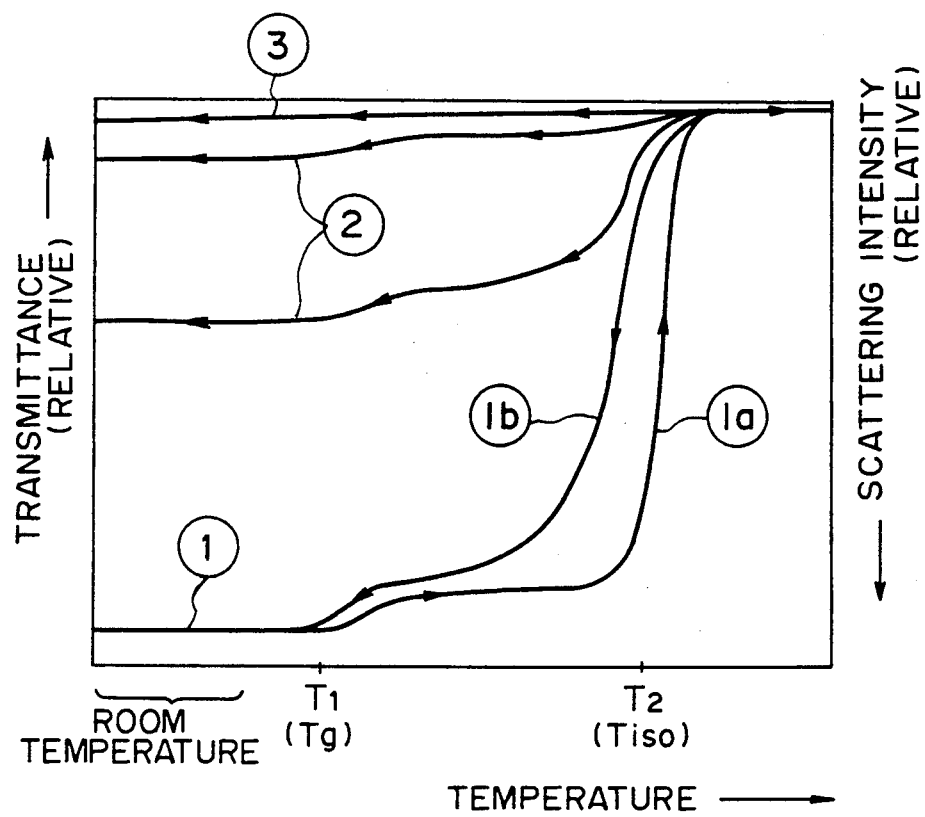
FIG. 1 is a diagram showing a relationship between the temperature and transmittance (scattering intensity)

The image forming medium of the present invention may suitably comprise a polymer, particularly a thermotropic polymer liquid crystal. Examples thereof may include a side chain-type polymer liquid crystal which comprises a main chain of a methacrylic acid polymer, a siloxane polymer, etc., and a mesogen or low-molecular weight liquid crystal unit in side chains thereof like pendants; and also a main chain-type comprising a mesogen unit in its main chain, such as those of the polyester-type or polyamide-type, as used in the field of high-strength and high-modulus, heat-resistant fiber or resin.

These polymer liquid crystal may assume smectic phase, nematic phase, cholesteric phase or another phase or can also be a discotic liquid crystal.

Another class of polymer liquid crystals suitably used in the present invention may include a polymer liquid crystal showing ferroelectricity by introducing an asymmetric carbon atom to assume SmC* (chiral smectic C) phase.

Specific examples of the polymer liquid crystal used in the present invention are enumerated hereinbelow while other polymer liquid crystals can also be used in the present invention.

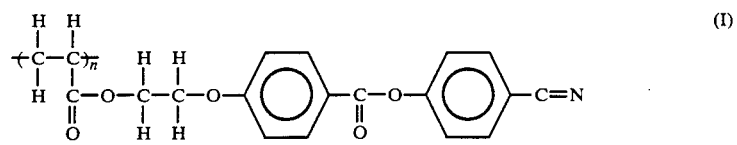

(I)

$\overline{M}w = 18,000$
Glass $\xrightarrow{75° C.}$ Liquid crystal phase (N) $\xrightarrow{110° C.}$ Iso.
N: nematic phase

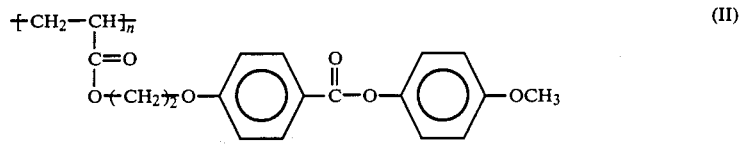

(II)

Glass $\xrightarrow{47° C.}$ Liquid crystal phase (N) $\xrightarrow{77° C.}$ Iso.

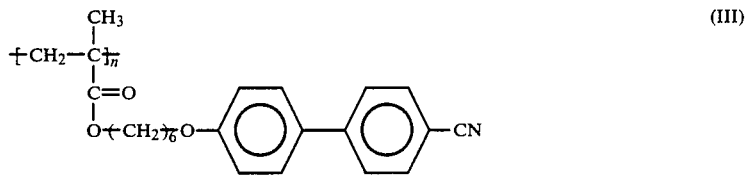

(III)

Glass $\xrightarrow{50° C.}$ Liquid crystal phase (Sm) $\xrightarrow{100° C.}$ Iso.
Sm: smectic phase

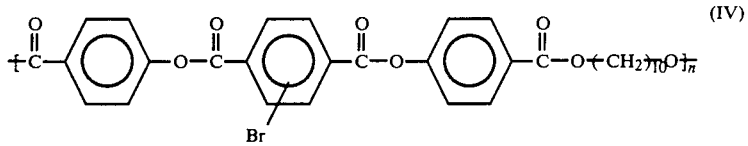

(IV)

Glass $\xrightarrow{140° C.}$ Liquid crystal phase (Sm) $\xrightarrow{196° C.}$ Iso.

The above polymer liquid crystals may be used singly or in combination of two or more species.

In order to form a layer, a polymer liquid crystal may be dissolved in a solvent to form a solution for application. Examples of the solvent used for this purpose may include: dichloroethane, dimethylformamide (DMF), cyclohexane, tetrahydrofuran (THF), acetone, ethanol, and other polar or non-polar solvents, and mixtures of these. Needless to say, these solvents may be selected based on consideration of such factors as dissolving power of the polymer liquid crystal used, and the material of or wettability of the substrate or surface layer formed thereon to be coated thereby.

An embodiment of the image forming medium of the present invention and a function thereof will now be explained based on a specific example wherein a polymer liquid crystal of the above formula (I) was used.

The above polymer liquid crystal was dissolved in dichloroethane at a concentration of 20 wt. % and the solution was applied by an applicator on a polyester transparent substrate washed with alcohol, followed by standing at 95° C. for 10 minutes to form a white scattering film in a thickness of 10 microns or slightly thicker.

The thus obtained white sheet was scanned in a pattern of character or figure by a thermal head, whereby a white pattern corresponding to the scanned pattern was fixed. When the sheet was placed on a backing member having an optical density of 1.2, a clear black display was obtained against the white background.

Then, the whole area of the above sheet having the above-mentioned pattern was heated to about 120° C. and then heated at about 90° C. for several seconds, whereby the original white scattering state was restored on the whole area and stably retained even if cooled to room temperature as it was, so that additional recording and display were possible.

The above series of phenomena can be controlled based on the fact that the above-mentioned polymer liquid crystal can assume at least three states including a film state below the glass transition point where it retains a stable memory state, a liquid crystal state where it can be transformed into a substantially optical scattering state and an isotropic film state at a higher temperature where it assumes an isotropic molecular alignment.

Now, the principle process of image formation by using a polymer liquid crystal layer formed on a transparent substrate is explained with reference to FIG. 1, which shows changes in reflectance or scattering intensity of a polymer liquid crystal layer versus temperature.

Referring to FIG. 1, the above-mentioned scattering state corresponds to a state ①. When the polymer liquid crystal layer in the state ① is heated by a heating means, such as a thermal head or laser light, to a temperature above $T_2$ (Tiso=isotropic state transition temperature) along a path denoted by 1a and then rapidly cooled, a light-transmissive state as shown by ③ similar to the isotropic state is fixed. Herein, "rapid cooling" means cooling at a rate sufficiently large as to fix the state before the cooling without substantial growth of an intermediate state, such as a lower-temperature liquid crystal phase. Such a rapid cooling condition can be realized without a particular cooling means and by having the recording medium stand in air for natural cooling. The thus-fixed isotropic state is stable at a temperature below $T_1$ (Tg: glass transition point), such as room temperature or natural temperature, and is stably used as an image memory.

On the other hand, if the polymer liquid crystal layer heated to above $T_2$ is held at a liquid crystal temperature between $T_1$ and $T_2$ for a period of, e.g., 1 second to several seconds, the polymer liquid crystal layer increases the scattering intensity during the holding period as indicated by a curve 1b to be restored to the original scattering state ① at room temperature. The resultant state is stably retained at a temperature below $T_1$.

Further, if the polymer liquid crystal layer is cooled while taking a liquid crystal temperature between $T_1$-$T_2$ for a period of, e.g., about 10 milliseconds to 1 second as indicated by curves , an intermediate transmissive state is obtained at room temperature, thus providing a gradation.

Thus, in this embodiment, the resultant transmittance or scattering intensity may be controlled by controlling the holding period at a liquid crystal temperature after heating into an isotropic state and until cooling to room temperature. The resultant state may be stably retained below $T_1$. Further, the velocity of restoring to the original scattering state is larger at a temperature closer to $T_2$ in the liquid crystal temperature renge. If the medium is held at a temperature within the liquid crystal temperature range for a relatively long period, the scattering state ① can be restored without heating once into isotropic phase or regardless of the previous state.

In the image forming process according to the present invention, a more beautiful image can be obtained by adding a factor for intensifying the above mentioned scattering state. For this purpose, it is preferred that a stabler optical scattering film has been formed by holding the polymer liquid crystal at a liquid crystal temperature (75° C.–110° C.) in the stage of evaporation of a solvent, such as dichloroethane, DMF (dimethylformamide) or cyclohexane after it is dissolved in the solvent and applied on a substrate or after the evaporation. An optimum condition for such a film formation is that the polymer liquid crystal is added to a solvent in such a proportion that a clear or viscous solution thereof is formed after the addition and stirring. For example, in case where the polymer liquid crystal of the above formula is singly dissolved in dichloroethane, it forms a white turbid micelle state at a concentration of 10 wt. %, but stably forms a transparent viscous solution at a relatively high concentration on the order of 15–25 wt. %. This tendency is observed also for other several types of polymer liquid crystals and combinations with another solvent. If such a transparent viscous solution is applied by means of an applicator, such as a wire bar, dipping, etc., onto a well washed substrate, such as glass or polyester and then held at the above-mentioned liquid crystal temperature, an optical scattering film having a higher uniformity can be obtained than in a case where a solution in the micelle state is similarly applied for film formation.

In this instance, the surface of the substrate is carefully cleaned without orientation or with wiping into plural directions with ethyl alcohol, etc.

The solvent for the polymer liquid crystal can be a mixture of plural solvents. Further, it is also possible to add an additive such as a colorant to the polymer liquid crystal within an extent not adversely affecting the coating.

Further, in order to avoid attachment of dust to or charging of the back surface of the substrate or the front surface of the polymer liquid crystal, it is possible to effect a treatment for providing the back surface or front surface with a weak electro conductivity.

Figure 2A:
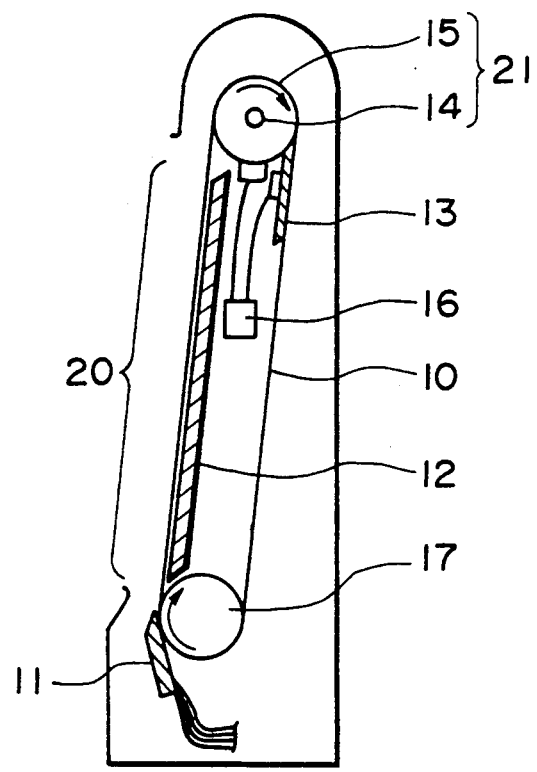
FIGS. 2A and 2B illustrate an image forming apparatus.

FIG. 2A is an illustration of a display apparatus for achieving the image forming method. Referring to FIG. 2A, the display apparatus comprises an image forming medium or image carrying member 10 in the form an endless belt capable of forming a display part 20, a thermal head (multi-head) 11, a backing member 12, a planer heater 13, a halogen roller 21 including a halogen lamp 14 and a roller 15, a temperature sensor 16, and a drive roller 17.

Figure 2B:
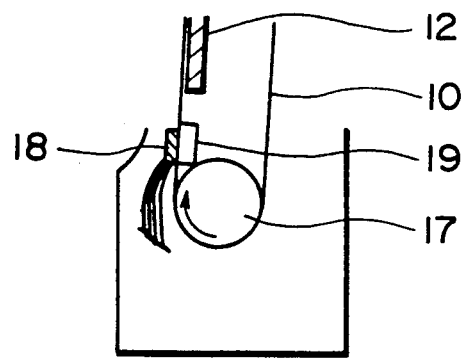

FIG. 2B is a partially enlarged view showing another structure around a thermal head part wherein a thermal head (serial head) 18 is used together with a platen 19.

Referring to FIG. 2A, in writing of an image, the drive roller 17 is driven in the direction indicated by the arrow, and the thermal head (multi-head) 11 is supplied with image signals, e.g., facsimile signals from another facsimile machine to imagewise heat a portion of the image forming medium where a transparent pattern image is formed. This operation is continued until a transparent pattern in a size of, e.g., A4 and then the image forming medium 10 is stopped at the display part 20, where a clear colored image in the color of the backing member 12 of a chromatic color or black is formed against a white background.

Then, erasure of the image is effected after a desired display of the image by rotating the drive roller 17 again in the direction of the arrow and uniformly heating the image forming medium 10 by means of the halogen roller 21 (including the halogen lamp 14 and the roller 15) and the planar heater 13. At this time, the temperature or output of the halogen roller 21 and the planar heater 13 is controlled based on the detected output from the temperature sensor 16. In this erasure operation, the belt-form image forming medium 10 is observed in such a manner that the portion thereof heated by the halogen roller 21 becomes substantially wholly transparent and is then wholly turned into a white scattering state while it passes by the planar heater 13. By this operation, the displayed image is wholly erased and the original white scattering state is restored.

In the apparatus, the polymer liquid crystal layer constituting the image forming medium 10 can be directly rubbed or scanned by the thermal head 13 for repetitive image formation as the polymer liquid crystal has sufficient heat resistance and film strength. It is however possible, as desired, to provide a protective layer of, e.g., polyimide or aramide on the surface, e.g., by lamination.

As shown in FIG. 2B, an ordinary serial thermal head 18 can be used in combination with a platen 19 instead of the multi-thermal head 11 so that it is moved transversely with the moving direction of the image forming medium 10 to effect serial scanning.

Further, it is possible to provide a gradational display by changing the intensity or duration of a voltage pulse applied to the respective dots of the thermal head 11.

Figure 3A:
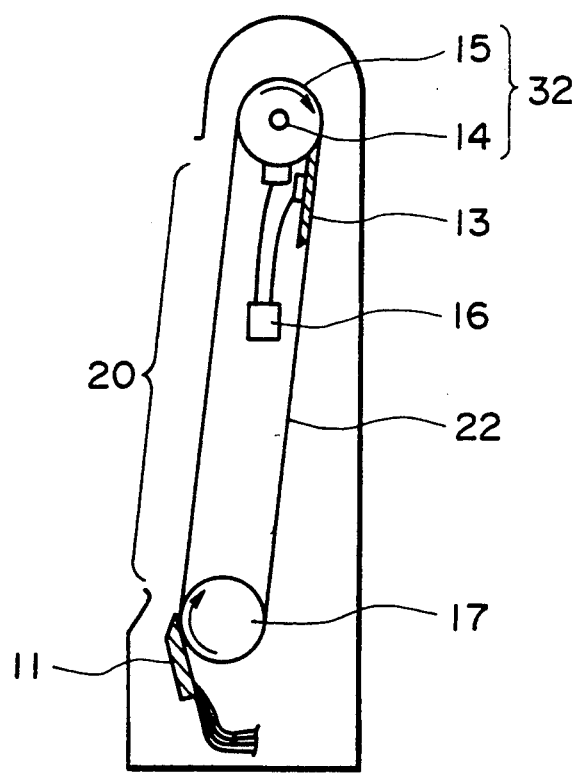
FIGS. 3A and 3B illustrate another structure of image forming apparatus.
Figure 3B:
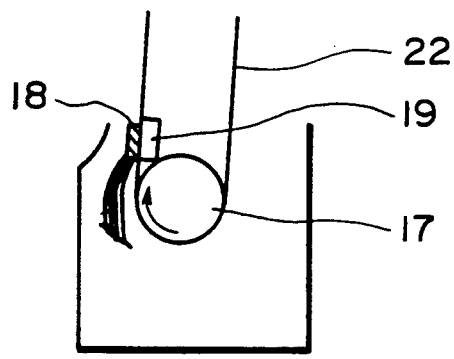

Further, it is also possible to use an image forming medium 22 in the form of a belt having an integrally laminated structure comprising an image forming layer and a color filter or color pattern as an optical absorbing member as shown in FIG. 3A. FIG. 3B is a partial enlargement view of the lower part.

Figure 4A:
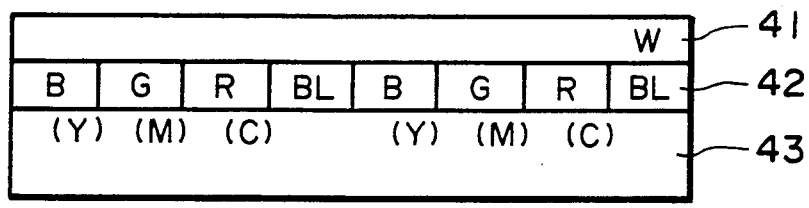
FIGS. 4A, 4B, FIGS. 5A, 5B and FIG. 6 illustrate image forming media including a color filter usable in the invention.
Figure 4B:
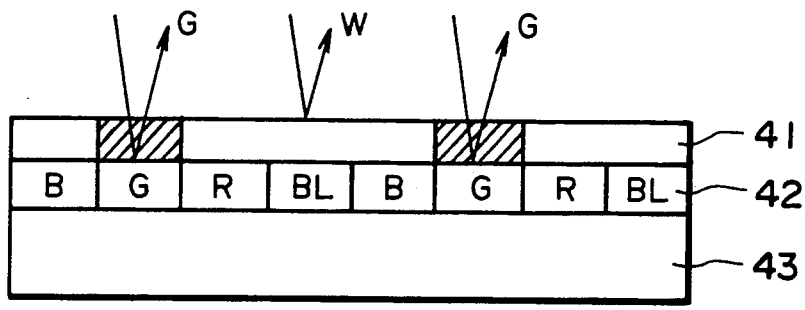
Figure 5A:
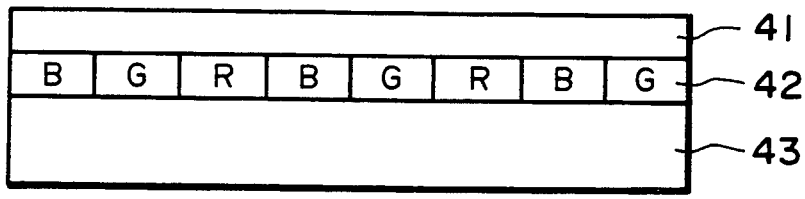
Figure 5B:
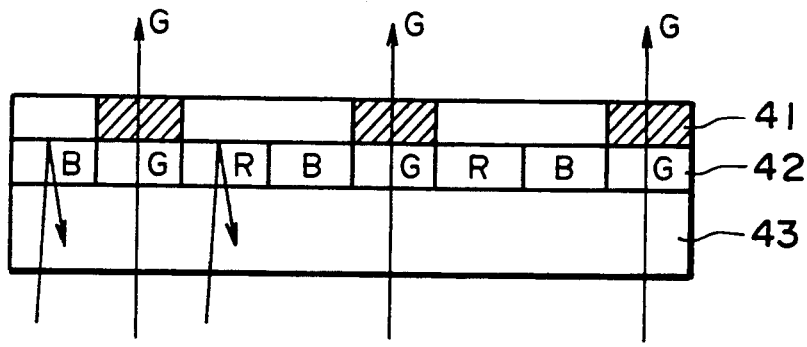
Figure 6:
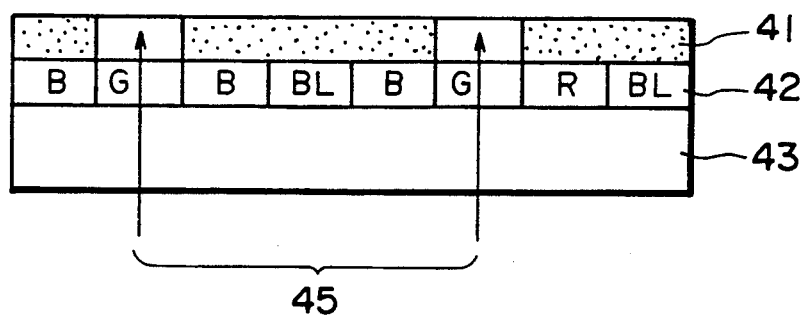

The color filter may for example assume a color pattern of mosaic, stripes, etc., including a combination of blue (B), green (G), red (R) and black (BL) or of yellow (Y), magenta (M), cyan (C) and black (BL). The image forming medium including such a color filter may assume a laminar structure comprising an image forming layer 41 (or 44) comprising a polymer, a color filter layer 42 and a substrate 43 as shown in FIGS. 4A, 5A and 6 and used for image formation by using a semiconductor laser beam 45 as shown in FIGS. 4B, 5B and 6.

The above-mentioned color filter pattern may be formed in an appropriate thickness at a density of 12 or more lines per mm including the respective colors by a conventional printing process, such as dot printing. The color filter pattern can be directly printed on the substrate or applied as a film onto the substrate.

Then, an image forming layer comprising a polymer liquid crystal as described above may be formed by coating, etc. At this time, it is possible to dispose an intermediate layer of a transparent film of, e.g., a polyester resin, aramide or polyimide on the color filter pattern by coating or lamination and then dispose thereon the polymer liquid crystal layer. In a specific embodiment using the polymer liquid crystal of the above formula (I), a thickness of about 2 microns or more provides a white scattering layer showing a sufficient optical hiding effect for hiding the lower color pattern. The thickness is optimally about 5 microns to 15 microns.

Now, a method of color image formation is explained with reference to FIG. 4B, wherein a color pattern of B, G, R and BL stripes is used as a backing layer 42.

As described above, when a polymer liquid crystal layer is formed in the white scattering state on the color pattern, the entire face of the image forming medium is observed as substantially white. Then, when only a portion corresponding to, e.g., "G" is heated to a temperature giving an isotropic phase or above by heating means, such as a thermal head followed by removal of the heating means, the part of the polymer liquid crystal layer above the G portion is fixed in the transparent state and the other non-heated portion remains white, whereby a green image against a white background is observed from the side of the polymer liquid crystal layer. If the polymer liquid crystal layer is heated in a portion corresponding to only R or B, a red or blue image, respectively, is observed against the white background. Further, if portions of the polymer liquid crystal layer corresponding to R and G, G and B, B and R, or all of R, G and B are heated, a color mixture of these primary colors is observed. It is possible to provide a stripe pattern of BL in order to provide a thick black color.

FIG. 5A shows another embodiment of the laminar structure of the image forming medium and FIG. 5B illustrates a state after the image formation.

Referring to FIG. 5B, portions of a polymer liquid crystal layer 44 corresponding to only green (G) filter dots with two dots apart are heat-scanned, e.g., by a thermal head to be transformed into a transparent state. Then, by using a conventional overhead projection, the image forming medium is illuminated from the side of the substrate 43 (FIG. 5B) or from the side of the polymer liquid crystal layer 41 to be projected onto a screen by transmission (FIG. 5B) or reflection, respectively. As a result, a green image is projected on the screen corresponding to the scanned portion while leaving the other portion substantially black. On the other hand, all the portions corresponding to all of B, G and R of the polymer liquid crystal layer are heated to be transparent and projected onto a screen, whereby a substantially white projection image is formed.

The image thus obtained in this embodiment is basically a negative image of a high contrast, and combination of various colors is possible. If a thermal head is used by controlling the magnitude and/or duration of pulse voltages, a full color image can be obtained in principle.

The image obtained above has a good observability in direct observation with a transmitted light when a backlight of a fluorescent lamp, an EL (electro-luminescence) panel, etc., is disposed behind the image forming medium.

FIG. 6 shows a laminar structure of another embodiment of the image forming medium. This embodiment is different from the one of FIG. 5 in that it utilizes a laser-absorptive heat generation so that a polymer liquid crystal layer 44 shows an absorption sensitivity to a semiconductor laser beam 45 and generates heat on illumination with the laser beam, and also a backing member 43 and a color filter pattern 42 which are transparent to the laser beam used.

In a particular embodiment shown in FIG. 6, the polymer liquid crystal layer 44 contains small amounts of a laser-absorbing dye showing an absorption peak around 750 nm (e.g., IR-750 available from Nippon Kayaku K.K.) for B, a dye showing an absorption peak around 820 nm (e.g., IR-120, ditto) for G, and a dye showing an absorption peak around 780 nm (e.g., CY-9, ditto). Alternatively, it is also possible to provide, e.g., by printing, an intermediate pattern layer (not shown) forming patterns which selectively contain any one of the above dyes corresponding to the patterns of B, G and R.

Further, laser beams having emission peaks around 750 nm, 820 nm and 780 nm, respectively, are used for scanning while being modulated so as to correspond to selection of B, G and R, respectively, whereby the corresponding parts of the polymer liquid crystal layer are heated to be transformed into a transparent state.

In the above embodiment, laser-absorptive dyes corresponding to respective colors are used. However, it is also possible to use a polymer liquid crystal layer containing a species of laser-absorptive dye, e.g., one represented by the formula:

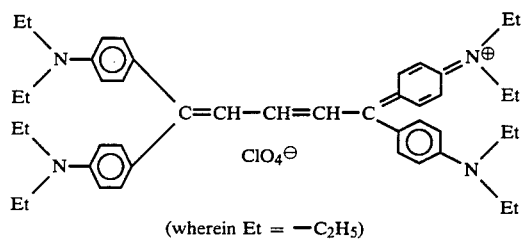

(wherein Et = $-C_2H_5$)

in combination with a laser beam showing an emission peak around, e.g., 830 nm corresponding to the above dye, while accurately controlling the scanning with the laser beam corresponding to the unit patterns of the color pattern 42.

Figure 7:
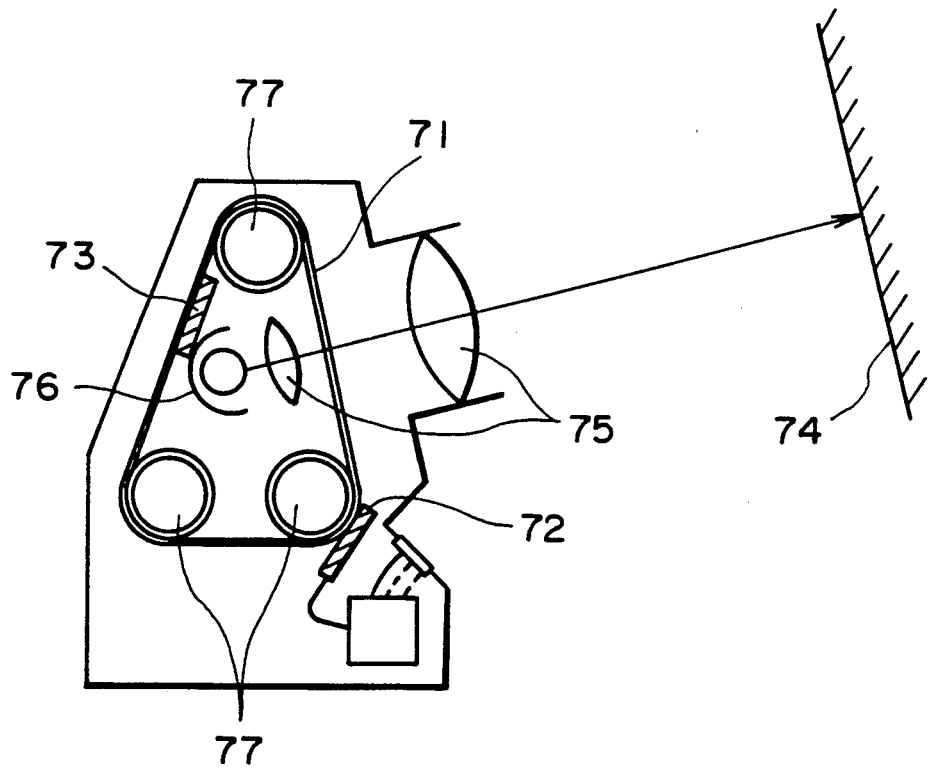
FIG. 7 illustrates a projection display apparatus.

FIG. 7 illustrates an embodiment of a projection display apparatus using an image forming medium having a color filter layer as shown in FIG. 4A or 5A.

In this apparatus, a desired color image is formed on an image forming medium 71 by a thermal head 72 and is then projected onto a screen 74 by means of a projection optical system comprising a lens 75 and a light source 76. After that, the image forming medium 71 having the image is heated to and held at a liquid crystal temperature for a prescribed time by a planar heater 71 for erasure, so that the image forming medium is uniformly erased into the original optical scattering state and prepared for next image formation.

In addition to the above, it is possible to form a projection display apparatus for an image forming medium of a micro-film size or a slide size by using a laser as a writing means.

The above-mentioned image formation can be effected at a higher contrast if the image forming medium includes an interface showing a characteristic of reflecting a light incident to the image forming layer between the image forming layer and the optical absorbing member or backing member. This is, for example, accomplished by decreasing the critical angle for total reflection at the interface with respect to light rays going toward the optical absorbing member in the image forming layer, thereby to decrease the amount of light rays reaching the optical absorbing member.

A preferred embodiment of the image forming member may include an intermediate layer having a lower refractive index than the image forming layer between the image forming layer and the optical absorbing member.

The function of such a preferred embodiment is explained with reference to FIGS. 8A–8D.

Figure 8A:
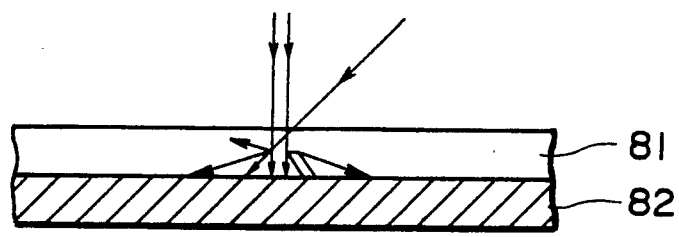
FIGS. 8A–8D illustrate a function of an image forming medium having a low refractive index layer.

In the case where an optical absorbing member 82 is disposed in intimate contact with the image forming layer 81 as shown in FIG. 8A, among light rays scattered by the image forming layer, those portions reaching the optical absorbing member are absorbed as they are. This corresponds to, e.g., a case where the polymer liquid crystal layer is formed by applying a solution thereof directly onto the optical absorbing member 82.

Figure 8B:
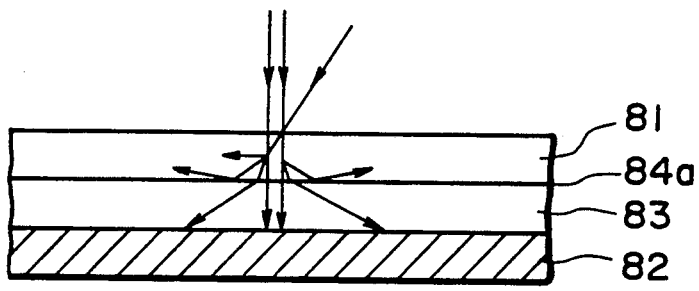

However, if a low refractive index layer 83 providing an interface 84a is disposed between the image forming layer 81 and the optical absorbing member 82 as shown in FIG. 8B, light rays are refracted at the interface 84a, and an increased proportion thereof is reflected back to the image forming layer 81 because it exceeds the critical angle. In other words, the proportion of light rays absorbed by the optical absorbing member 82 is decreased, and the scattering intensity of the image forming layer is apparently enhanced. Moreover, if the low-refractive index layer 83 is white, an increased hiding power is attained to provide a white appearance.

Figure 8C:
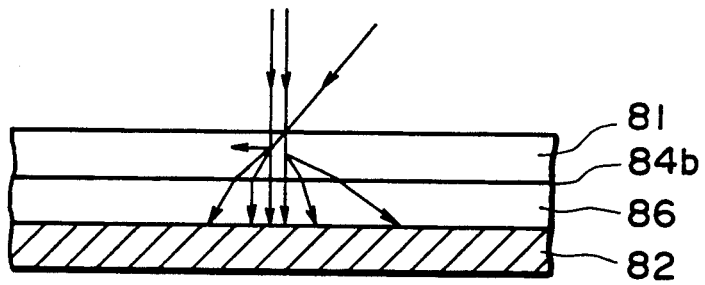

On the other hand, if an intermediate layer 86 having a higher refractive index than the image forming layer 81 is disposed between the image forming layer 81 and the optical absorbing member 82 as shown in FIG. 8C, the critical angle of reflection to the image forming layer 81 at the interface 84b between the image forming layer 81 and the high-refractive index layer 86 is increased, a lower degree of scattering results than in the case of FIG. 8B. However, compared with the case of FIG. 8A, a somewhat increased degree of scattering is attained. The case of FIG. 8C corresponds to, e.g., a case where the optical absorbing member is intimately laminated with a binder layer and the image forming layer as by coating.

Figure 8D:
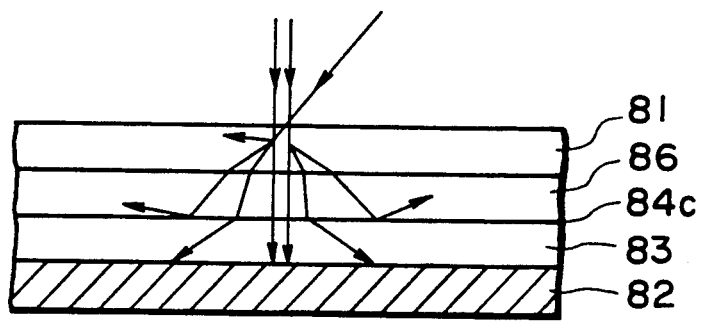

However, as shown in FIG. 8D, if a low-refractive index layer 83 is further disposed between a high-refractive index layer 84 as shown in FIG. 8C and the optical absorbing medium 82, then an increased degree of reflection to the high-refractive index layer 84 is again attained at the interface 84C. As a result, the amount of light rays absorbed by the optical absorbing member is decreased and the image forming scattering layer 84 appears whiter.

The above-mentioned low-refractive index layer (having a lower refractive index) than the image forming layer may be most desirably a layer of air or vacuum.

For the image forming layer comprising a polymer liquid crystal for example, the low-refractive index layer may suitably have a refractive index of 1–1.4, most suitably 1.1 or below. The thickness of the low-refractive index layer is sufficient if it exceeds the wavelength of substantially white light. For example, a sufficient thickness of air layer may be obtained even when the optical absorbing member partially contacts another layer, if such another layer is not a highly refractive adhesive layer. This condition is accomplished where at least one of both surfaces sandwiching the low-refractive air layer has a surface roughness in terms of $R_Z$ (JIS B0601-1982) of about 0.8 micron or above, preferably 1 micron or above.

The above-mentioned increase in contrast by provision of a low refractive index layer is also attained by using a reflecting member in place of the above mentioned optical absorbing member as a backing member. Further, a good result can be also attained by using as the image forming layer an ordinary optical scattering layer such as a layer causing phase separation or a layer causing dynamic scattering like that of a liquid crystal. Thus, the image forming medium of the present invention may be constituted by a laminate structure including an optical scattering layer, a backing member (inclusive of an optical absorbing member and a reflecting member), and a low-refractive index layer having a lower refractive index than the optical scattering layer; or a laminate structure including an interface reflecting a light incident to an optical scattering layer between the optical scattering layer and a backing member.

Figure 10:
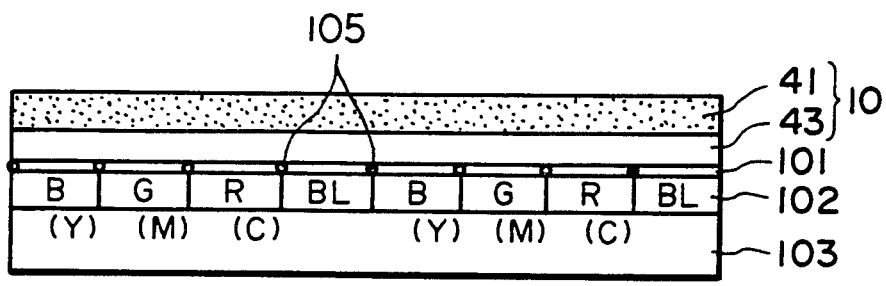
FIGS. 10, 11 and 12 are sectional views showing an image forming medium having a low refractive index layer.

FIG. 10 illustrates a laminar structure of an image forming medium including a low-refractive index layer.

Referring to FIG. 10, the image forming medium is formed by disposing on a backing substrate 103 a colored backing member 102 having a color pattern of mosaic, stripes, etc., including a combination of blue (B), green (G), red (R) and black (BL) or of yellow (Y), magenta (M), cyan (C) and black (BL), disposing on the color backing member 102 spacer beads 105 such as those of glass, resin or inorganic pigment, and further disposing thereon an image forming member, by lamination, which comprises a transparent substrate 43 and a polymer liquid crystal layer 41 as a white scattering layer coating the substrate. In this embodiment, a spacing given by spacer beads provides an air gap layer 101 functioning as a low-refractive index layer.

The above-mentioned color pattern may be formed in an appropriate thickness at a density of 12 or more lines per mm including the respective colors by a conventional printing process, such as dot printing. The color pattern can be directly printed on the substrate or applied as a film onto the substrate.

The spacer beads 105 may preferably have a diameter of about 1–10 micron so as to provide the air gap layer with a thickness of about 1–200 microns, preferably about 5–10 microns.

The substrate 43 supporting the polymer liquid crystal layer 41 may desirably be as thin as possible within an extent that the polymer liquid crystal layer 41 can be formed thereon by coating and may have a thickness of about 3 microns–1 mm, preferably 1 micron–50 microns. The tolerance of the thickness as well as that of the air gap layer is governed by the required resolution of a color image to be formed.

The polymer liquid crystal layer 41 may have a thickness of about 1 micron or larger, particularly about 5 microns–15 microns so as to function as a white scattering layer showing a sufficient optical hiding power.

Figure 11:
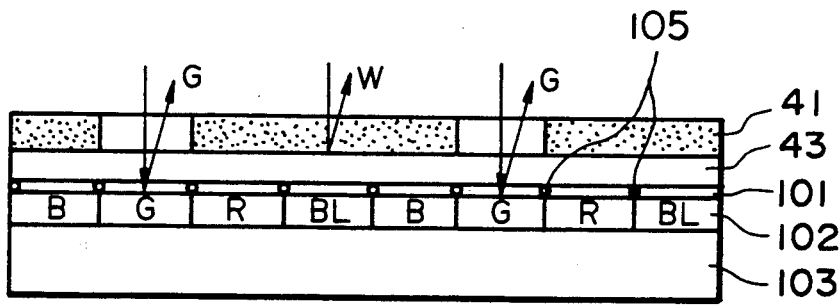

Now, a method of color image formation according to this embodiment is explained with reference to FIG. 11, wherein a color pattern of B, G, R and BL stripes is used as a backing layer 102.

As described above, when the transparent substrate 43 supporting the polymer liquid crystal layer formed in the white scattering state is disposed on the stripe pattern 102 by the medium of the spacer beads 105, the entire face of the image forming medium is observed as substantially white. Then, when only a portion corresponding to, e.g., "G" is heated to a temperature giving an isotropic phase or above by heating means, such as a thermal head followed by removal of the heating means, the part of the polymer liquid crystal layer above the G portion is fixed in the transparent state and the other non-heated portion remains white, whereby a green image against a white background is observed from the side of the polymer liquid crystal layer. If the polymer liquid crystal layer is heated in a portion corresponding to only R or B, a red or blue image, respectively, is observed against the white background. Further, if portions of the polymer liquid crystal layer corresponding to R and G, G and B, B and R, or all of R, G and B are heated, a color mixture of these primary colors is observed.

Figure 12:
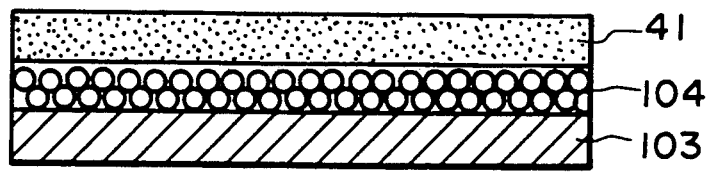

FIG. 12 shows another embodiment of the laminar structure of the image forming medium wherein a porous layer 104 is disposed between the polymer liquid crystal layer 41 and the backing substrate 103 so as to provide an appropriate air gap.

Such a porous layer 104 may for example be prepared by forming a layer of a resin, such as urethane resin, containing a foaming agent such as $NaHCO_3$ or another organic or inorganic foaming agent capable of generating a gas such as $N_2$ gas, followed generally by heating. Further, in case of the above-mentioned urethane resin, for example, the resin may be dissolved in DMF (dimethylformamide) and then applied onto the backing substrate 103, followed by soaking in water, to form a layer which has a relatively tight surface but contains appropriate sizes of bubbles inside thereof. Another method may also be applicable of course. The porous layer 104 may generally comprise bubbles in sizes of 1–100 microns.

Figure 9:
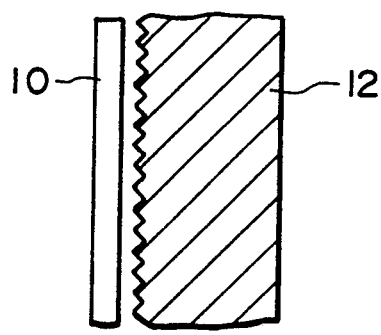
FIG. 9 is a partial sectional view of a display part.
Figure 13:
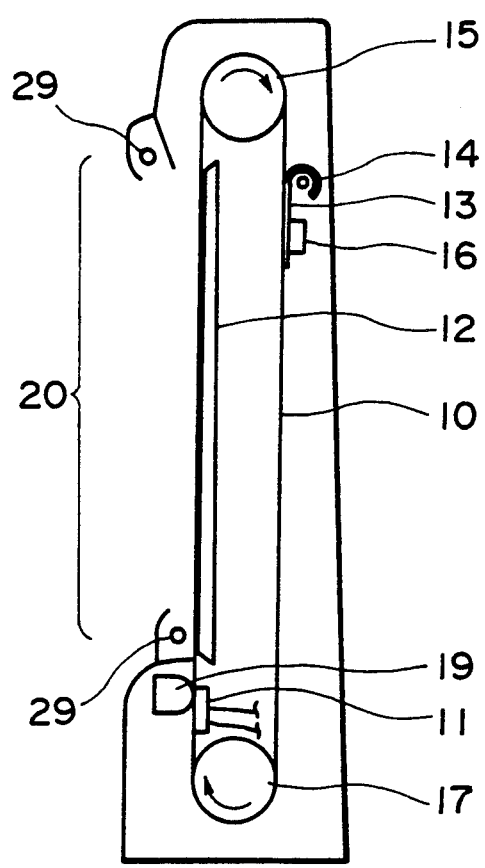
FIG. 13 illustrates a color display apparatus.

It is further possible to use an apparatus structure wherein an image forming layer and an optical absorbing member (backing member) are positively disposed to have a spacing therebetween functioning as a low-refractive index layer as mentioned above. In other words, a similar effect is accomplished by adjusting a relative arrangement between the image forming layer and the optical absorbing member so as to provide an interface reflecting a light incident to the image forming layer. For example, an image forming layer and an optical absorbing member or backing member may be separately incorporated in an image forming apparatus as shown in FIG. 13. The image forming apparatus comprises an image forming medium 10 in the form of a belt capable of forming a display part 20, a thermal head 11, a color backing member 12, a heater for erasure 13, a halogen lamp 14, drive rollers 15 and 17, a temperature sensor 16, a platen 19, and an illumination lamp 29. FIG. 9 shows an enlarged view of the display part 20.

The above-mentioned low-refractive index layer is constituted by an air gap between the image forming medium 10 and the optical absorbing member or backing member 12 which is disposed with a gap from or in slight contact with the backing member 12.

In the image forming apparatus shown in FIGS. 13 and 9, in case where the optical absorbing member is a color filter pattern, a preferable image forming apparatus avoiding a deviation in color display may be provided if it comprises a means for controllably and relatively moving the image forming layer and the color filter pattern.

Figure 14:
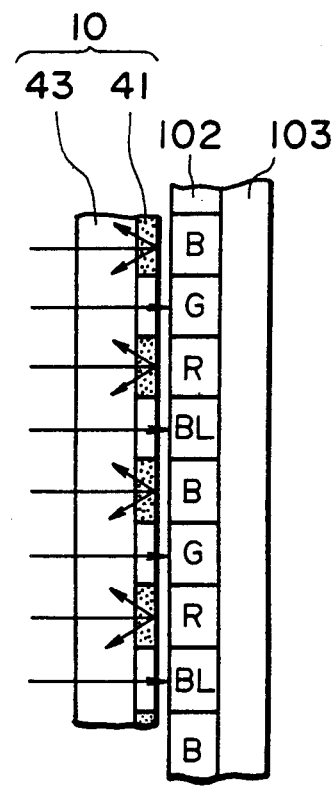
FIG. 14 is a partial sectional view illustrating an image forming belt and a color background.
Figure 15:
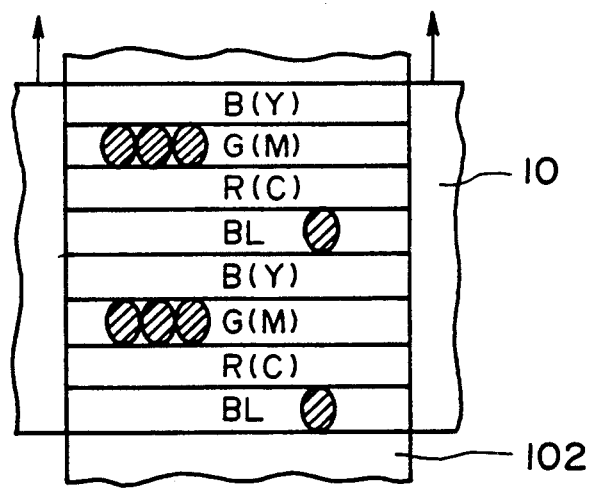
FIG. 15 is a corresponding partial front view.

FIGS. 14 and 15 illustrate an operation of such a preferred embodiment. More specifically, FIG. 14 is a partial sectional view showing an image forming medium in the form of a belt 10 comprising a transparent substrate 43 and a polymer liquid crystal layer 41, and a color pattern 102 formed on a backing substrate 103. FIG. 15 is a front view showing a relative position of the image forming belt 10 and the color backing member 102.

Image writing will be explained with reference to FIGS. 13–15. In order to show a part of green (G) elements and a part of black (BL) elements, the image forming belt 10 is moved and the thermal head 11 is energized to form and fix a transparent pattern so as to correspond to the part of the G elements and B elements of the color pattern 102. Then, the image forming belt 10 is moved to a display position 20 and stopped when the above-fixed transparent pattern is aligned with the desired color pattern. Then, the illumination lamp 29 disposed in front of the display position 20 is turned on, whereby a green and black image is clearly observed.

Similarly, if parts of the polymer liquid crystal layer 41 corresponding to R and B, a color mixture of these primary colors is observed at the display positions.

Figure 16A:
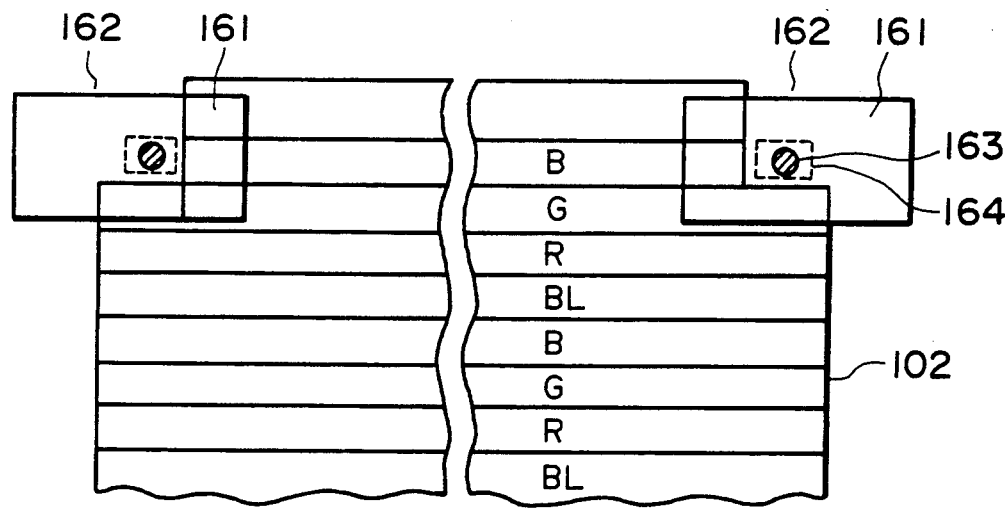
FIGS. 16A–16C are explanatory views for an alignment detection method.
Figure 16B:
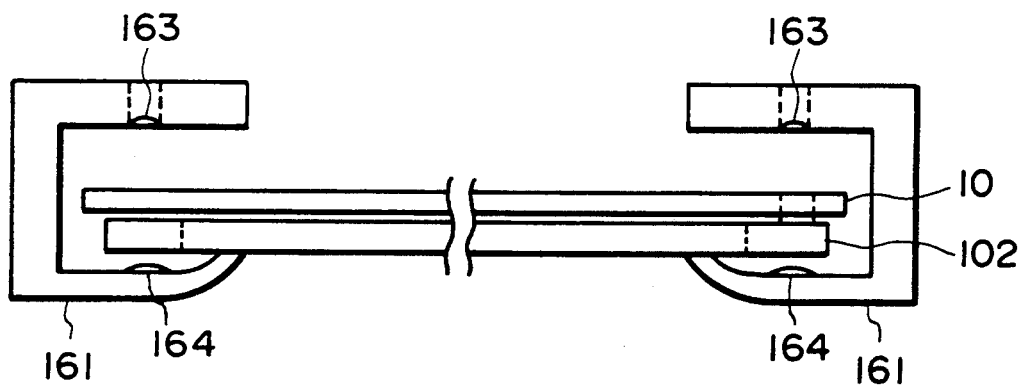
Figure 16C:
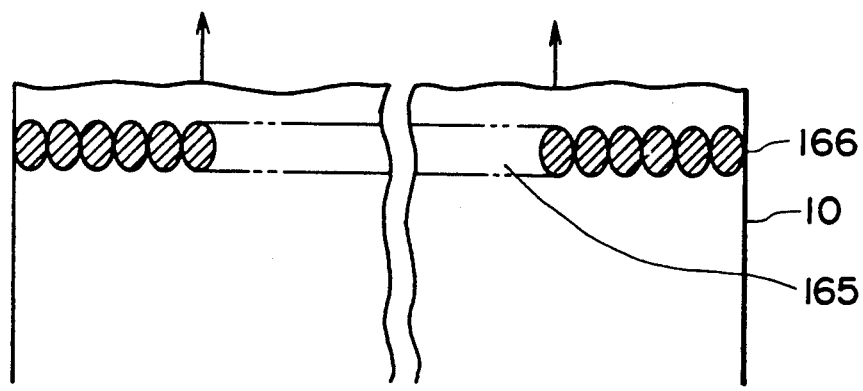

Now, a method for better alignment between the pre-formed transparent pattern and the respective colors of the color pattern is now explained with reference to FIGS. 16A–16C. In this embodiment, a photocoupler is provided to the color backing member 102 so as to align the pre-formed transparent pattern of the image forming belt and the color pattern of the color backing member 102. For this purpose, as shown in FIG. 16A, a cut 162 is formed at a part of a leading blue (B) pattern unit of the color pattern 102, and a photocoupler 161 is disposed at the cut 162 so that its photo-emission element 163 and photo-receiving element 164 face each other. FIG. 16B shows a side view of this state. On the other hand, a transparent part 165 is necessarily formed on the image forming belt 10 at a time corresponding to a blue (B) image element immediately after commencement of image writing during its movement. Thereafter, a desired transparent image pattern is written by the thermal head 11 and moved to the display position 20. There, when the transparent part formed corresponding to the leading blue (B) arrives at the position of the above-mentioned photocoupler, a maximum quantity of light rays emitted from the emission element 163 is detected by the receiving element 164, and the information is fed back to a drive motor (not shown) for the belt 10, so that the image forming belt 10 is stopped at the prescribed position.

According to this embodiment, an effective alignment is accomplished by controlling only a writing pitch for the respective colors if the image forming belt is driven accurately at a constant speed during formation of a transparent pattern according to given image signals. This embodiment provides a larger flexibility in selection of an image forming position compared with, e.g., a case where a color pattern for alignment is directly provided to the image forming belt 10.

Further, as described above, if the surface (on the color pattern side) of the image forming medium or the surface of the color backing member has an appropriate roughness, the degree of whiteness of a non-written portion is intensified even when they contact each other.

Figure 17A:
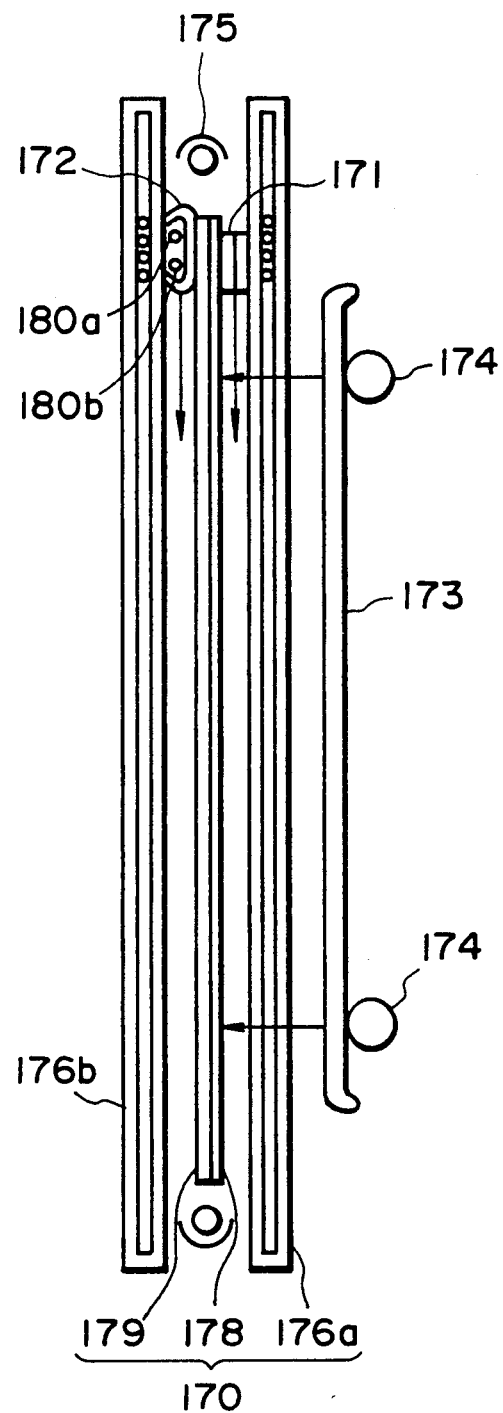
FIGS. 17A and 17B are a side view and a front view, respectively, for illustrating another embodiment of the color display apparatus.
Figure 17B:
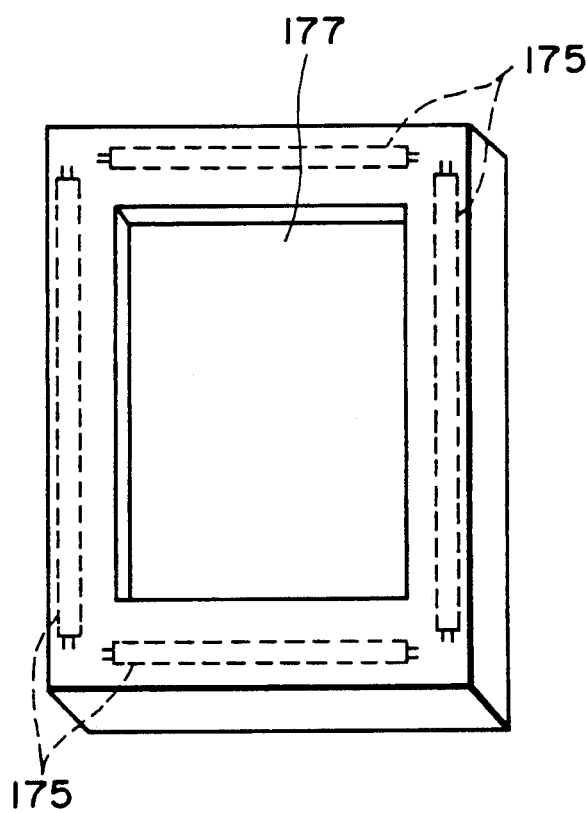

FIGS. 17A and 17B show another embodiment of the present invention, wherein FIG. 17A is a schematic side view of a color display apparatus and FIG. 17B shows a perspective outline thereof. In this embodiment, an image forming medium 170 comprising a polymer liquid crystal layer 178 and a transparent substrate 179 together with a support 176a is fixed while a thermal head 171 as image-writing means and a heater 172 as image-reasure means comprising halogen lamps 180a and 180b are moved.

An embodiment of the image formation sequence is explained hereinbelow.

(1) The thermal head 171 is returned to its home position.

(2) The thermal head 171 is driven in the direction of an arrow along the support 176a to form a transparent pattern on the image forming medium 170.

(3) A color backing member 173 is caused to be in the vicinity of or in contact with the image forming medium 170 having the transparent pattern by pressing means 174.

(4) The color backing member 173 is finely adjusted vertically and/or laterally by using a drive means (not shown) therefor and a positioned alignment detection method as described hereinafter so that the color pattern and the above-formed transparent pattern are aligned with each other.

(5) An illumination lamp 175 is turned on as desired to effect a color image display.

Next, an embodiment of image-erasure sequence is raised hereinbelow.

(6) The illumination lamp 175 is turned off.

(7) The color backing member 173 is separated away from the image forming medium 170.

(8) A halogen lamp 180b in the image erasure heater 172 is turned on and the heater 172 is slowly moved in the direction of an arrow in contact with the transparent substrate 179 side of the image forming medium 170 so that the image forming medium assumes a temperature above Tiso ($T_2$) in the neighborhood of the halogen lamp 180b and a liquid crystal temperature of the polymer liquid crystal used in other major parts facing the heater 172 with a temperature detection means (not shown).

The image-erasure heater 172 as erasure means comprises two halogen lamps 180a and 180b of which the remaining lamp 180a is turned on when the heater 72 is moved upward for subsequent image erasure.

Then, an embodiment of the above-mentioned alignment detection method is explained with reference to FIGS. 18A and 18B.

Figure 18A:
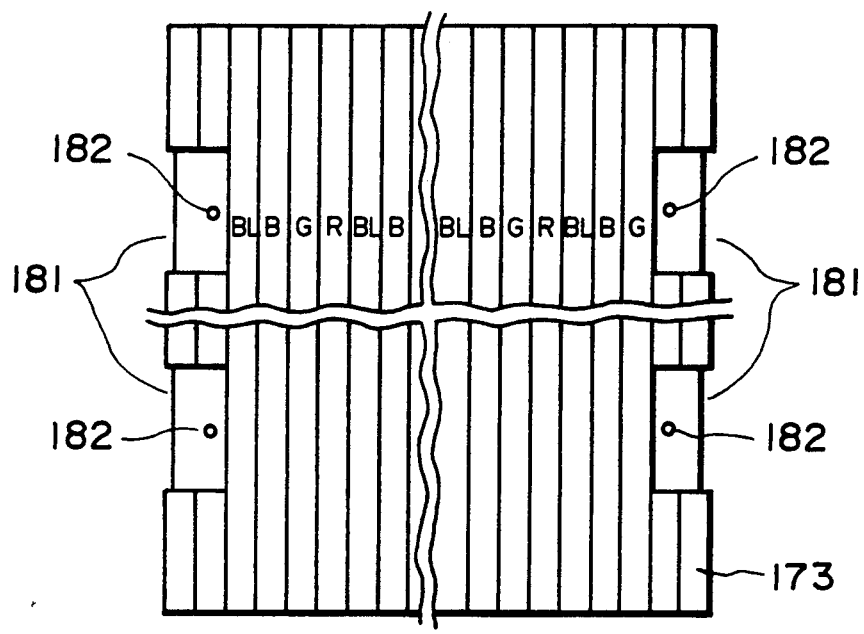
FIGS. 18A and 18B are explanatory views for an alignment detection method.
Figure 18B:
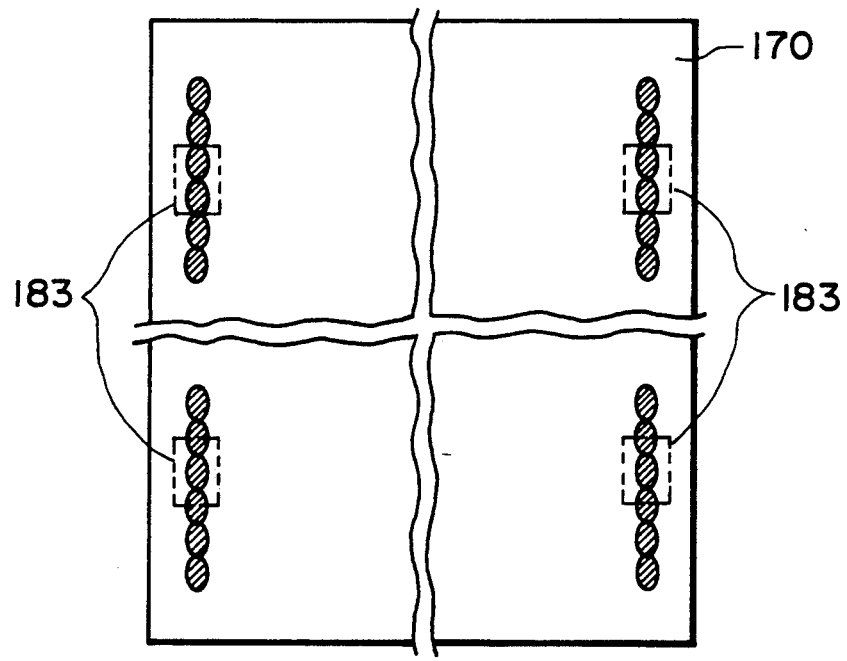

Referring to FIG. 18A, in this embodiment, a color backing member 173 comprising stripes of B, G, R and Bl is used, and cuts 181 are formed at, e.g., four parts thereof where minute light-emission elements such as LEDs or laser diodes are disposed at a good accuracy together with lenses, etc., as desired. On the other hand, the image forming medium 170 is provided with light-receiving elements at four parts on the transparent substrate 179 side thereof corresponding to the above-mentioned four parts of the emission elements 182.

In image formation, the dot drive of the thermal head 171 is effected so as to form transparent parts at four parts of the image forming layer 178 corresponding to the positions of the light-receiving elements on the substrate 179. It is preferred that the transparent parts for alignment are formed outside a prescribed display area.

Then, the backing member 173 is placed in the vicinity of or in contact with the image forming medium 174, finely moved relative to the latter as described above and then stopped at a position where the light quantities received by the receiving elements 183 at the four parts respectively assume a maximum.

Also in this embodiment, the color backing member 173 can substantially contact the latter if it has an appropriately rough surface. Further, if a minute gap is provided therebetween and the illumination lamp 175 is disposed so that a slight part of the illumination light enters the gap, the white scattering effect is apparently enhanced.

Figure 19:
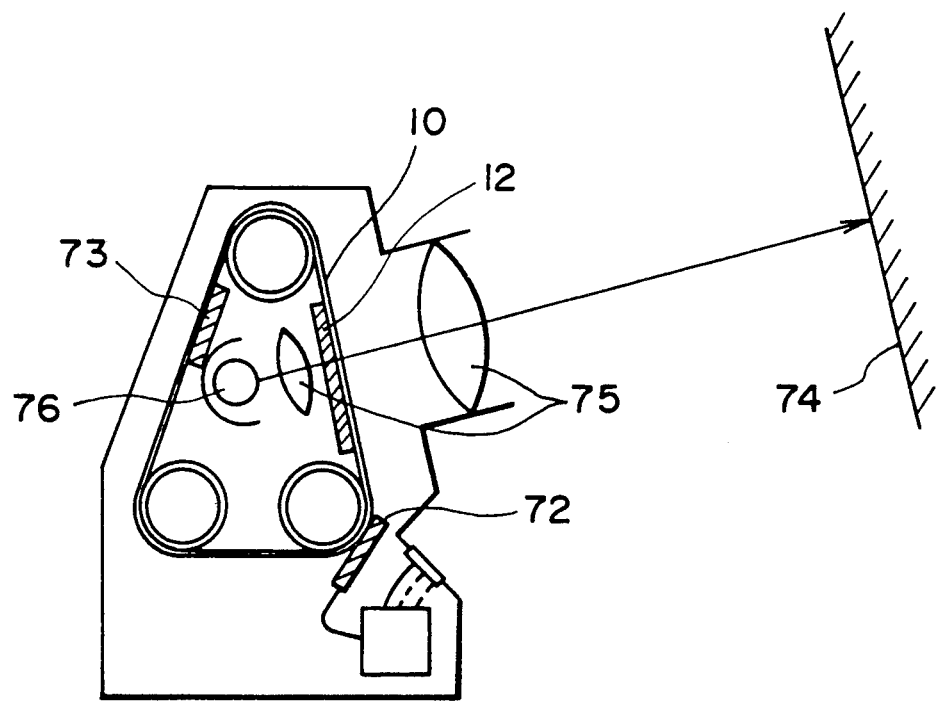
FIG. 19 is an illustration of a projection display apparatus having a control means according to the invention.

FIG. 19 illustrates an embodiment applied to a projection display apparatus. The embodiment shown in FIG. 19 is different from the one shown in FIG. 7 in that it comprises an image forming belt 10 which is composed of an image forming layer alone and is not integral with a color filter, and separately comprises a color backing member 12.

The color backing member 12 comprises a color filter pattern of R, G and B to provide a color image in combination with a transparent pattern formed on the image forming belt 10, and the color image is projected for display. More specifically, a transparent pattern is formed on the image forming belt by using a thermal head 72 and is moved to the rear of the color backing member 12, whereby a color image is projected onto a screen 74 by means of a projection optical system comprising a lens 75 and a light source 76. Thereafter, the image forming belt 10 having the transparent image is heated to and held at a liquid crystal temperature for a prescribed period by a planar heater for erasure 73 to be uniformly erased into an optical scattering state and prepared for subsequent image formation.

Herein, it is further effective to incorporate the above-mentioned positioned alignment means in the apparatus shown in FIG. 13 or 19.

A further embodiment of the image forming apparatus according to the present invention will be explained hereinbelow.

If an image forming layer and a color filter pattern or backing member are integrated to form an integral image forming medium or belt as shown in FIGS. 4A, 4B, FIGS. 5A, 5B, FIG. 10, FIG. 11 or FIG. 12, no problem is encountered with respect to positional deviation between the image forming layer and the color filter pattern. However, if a positional deviation occurs between the respective color pattern on the image forming layer and a writing means such as a thermal head, a different color is displayed at a position where a prescribed color is to be displayed, thereby to cause so-called color deviation or image deviation. For this reason, this embodiment of the image forming apparatus according to the present invention includes means for detecting a positional deviation between an image forming medium and a data-writing means and controlling the positional deviation. As a result, such a positional deviation is removed before writing to provide a highly fine image free of color deviation or image deviation.

An embodiment of such an image forming apparatus is explained with reference to FIG. 20.

Figure 20:
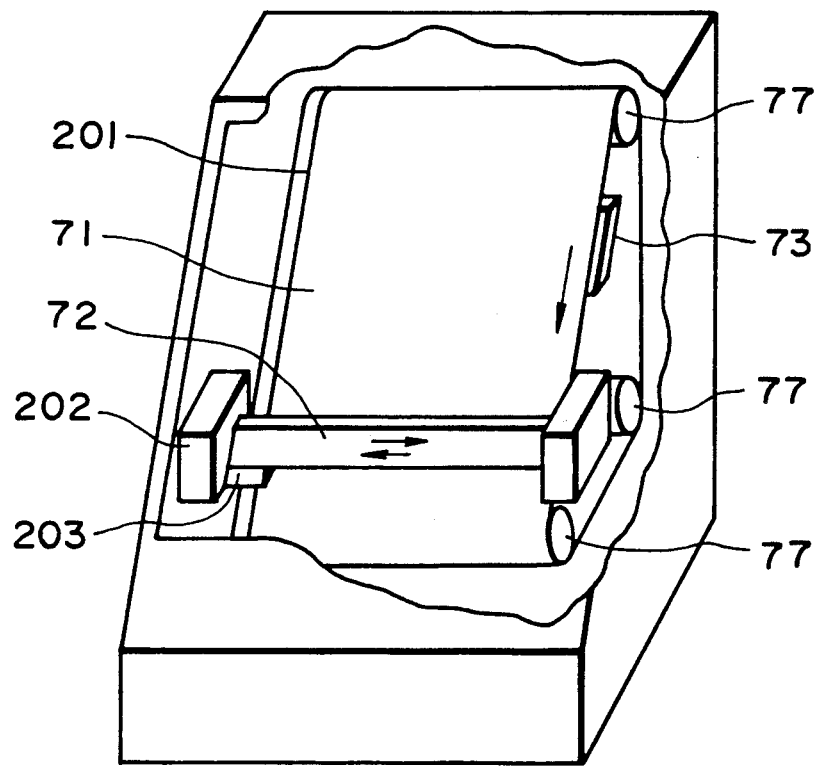
FIG. 20 is a schematic sectional view of an image forming medium containing a fluorescent agent.

Referring to FIG. 20, an image forming medium 71 in the form of a belt including an image forming layer and a color filter is wrapped around rollers 77 at three parts and is driven in the direction of an arrow by a rotational drive means such as a motor (not shown). The image forming medium 71 is provided with a detection standard line 201 for detecting a relative positional deviation with respect to a data-writing means. A thermal head 72 disposed in contact with the surface of the image forming medium 71 function as a data-writing means and effects thermal writing depending on given image signals. A written image is heated to be erased by an erasure means 73 to restore the original state of the image forming medium 71.

More specifically, image signals sent from an external memory medium such as a floppy disk are converted into heat in the form of dots by heating elements of the thermal head 72 to write an image onto the image forming medium moving at a constant speed. The image forming medium carrying visualized image data is further conveyed by the rotation drive means to display the image outwardly at a display position (not shown) disposed on the rear side of the apparatus body (as viewed from the direction of the drawing).

The projection display apparatus is provided with a position detection means 203, an adjusting means 202 and a control means (not shown).

The position detection means 203 comprises a line sensor of, e.g., CCD (charge coupled device), and its attendant electrical system. The position detection means 203 reads the position of the detection standard line and sends positional deviation data to the control means. The control means sends a position correction signal based on the positional deviation data to the adjustment means 202 comprising a pulse motor and a ball screw. The adjustment means 202 drives the thermal head 72 connected to the ball screw in synchronism with the position correction signal and corrects the relative position between the thermal head 72 and the image forming medium 71 as necessary during the drive of the image forming medium 71.

Through the above series of operation, a highly fine color image free from color deviation can be formed on the image forming medium 71.

In the above embodiment, an optical detection means comprising a CCD line sensor is used as the position detection means 203. Alternatively, it is possible to provide projections on the image forming belt for mechanical or optical detection thereof or to provide the belt with a conductor line for detection of a resistance division in a transverse direction.

In addition to the embodiment described above, the adjustment means 202 can comprise a pulse motor and a steel belt, screw, timing belt, cam, electromagnet, etc., or can comprise a piezoelectric bimorph element.

In order to provide an image forming medium capable of forming an image with an improved observability or recognizability through an increased optical scattering or photoemission to improve a contrast, it is also effective to incorporate a fluorescent agent or nucleating agent in a polymer liquid crystal in addition to the above-mentioned provision of a low-refractive index layer.

Figure 21:
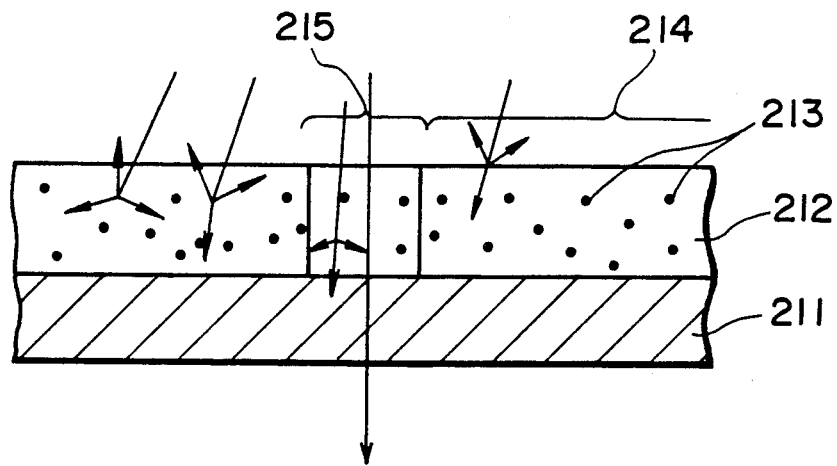
FIGS. 21 through 23 are respectively a schematic sectional view of an image forming medium containing a nucleating agent.

FIG. 21 is a schematic sectional view of an image forming medium comprising a substrate and a coating layer of a polymer liquid crystal containing a fluorescent agent (fluorescent whitening dye). The substrate 211 comprises a 100 microns-thick PET (polyethylene terephthalate) film. The substrate is coated with a solution of the polymer liquid crystal of the above formula (I) in dichloroethane mixed with a fluorescent agent 213. At this time, the concentration of the polymer liquid crystal may preferably be 10-20 wt. % of the total weight of the coating liquid. Further, the fluorescent whitening agent is added within an extent not to provide ill effects to coating, preferably 0.01 wt. %-25 wt. % of the polymer liquid crystal, or 0.01 wt. %-10 wt. % of the total coating liquid.

The above coating of the solution may be effected by spin coating, dipping, or by using a wire bar, an applicator, or by printing such as the screen printing process.

The solution thus applied on the substrate is caused to stand at a liquid crystal temperature (80°-110° C.) for a prescribed time during the stage of evaporation of the solvent or after the evaporation to be formed into a polymer liquid crystal layer 212 in the state of a stable optical scattering film. The fluorescent whitening dye 213 may be of the stilbene-type, diaminodiphenyl-type, imidazole-type, imidazolone-type, triazole-type, thiazole-type, oxazole-type, coumarin-type, carbostryl-type, naphthalimide-type, etc.

A light (arrow in the figure) incident to the polymer liquid crystal layer 212 is absorbed by the fluorescent whitening dye 213 to emit a light having a longer waveform than the absorbed light and the portion of the light not absorbed forms a scattered light if the polymer liquid crystal layer is in the scattering state 214. In other words, in the scattering state, not only the scattered light but also the emitted light from individual fluorescent dye particles are effectively utilized to increase the scattering efficiency.

On the other hand, the optical scattering film formed in the above-described manner is transformed into an amorphous (isotropic) state 215 when it is heated to Tcl (clear point) or above of the polymer liquid crystal. The amorphous state is transparent to light. The transparent state is retained if the polymer liquid crystal is rapidly cooled to below the Tg (glass transition temperature) of the polymer liquid crystal after the heating.

Further, if the polymer liquid crystal film is heated to above Tcl and then held at a liquid crystal temperature followed by cooling, the scattering state is again formed and fixed at a temperature below Tg.

In the transparent state 215, the light incident to the polymer liquid crystal layer 212 is transmitted therethrough or absorbed by the fluorescent whitening dye to emit a light which is transmitted through the polymer liquid crystal layer. Light propagated through the layer is scattered at a boundary with the scattering state portion 212, where an especially increased light quantity is observed to further clarify the boundary between the transparent and scattering states.

A preferable light source is one emitting ultraviolet rays in addition to visible rays, whereby the above-mentioned effect of the fluorescent agent is enhanced.

Figure 22:
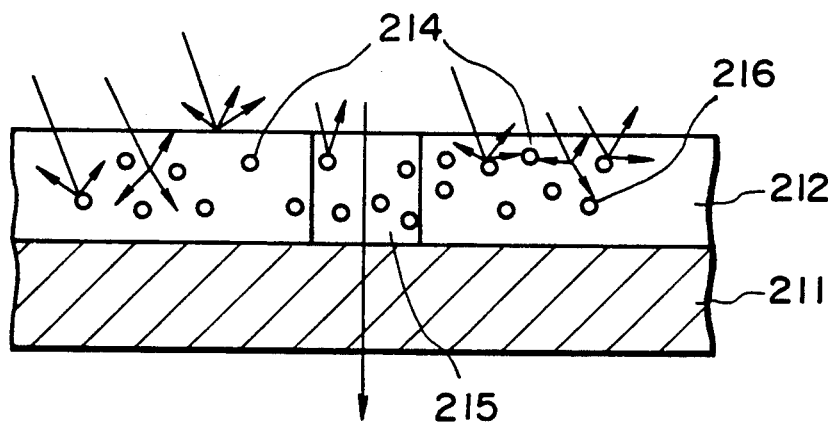

FIG. 22 is a schematic sectional view of an image forming medium comprising a substrate and a coating layer of a polymer liquid crystal containing a nucleating agent. The substrate 211 comprises a 100 microns-thick PET (polyethylene terephthalate) film. The substrate is coated with a solution of the polymer liquid crystal of the above formula (I) in dichloroethane mixed with a nucleating agent 216 (minute titanium oxide particles). At this time, the concentration of the polymer liquid crystal may preferably be 10–20 wt. % of the total weight of the coating liquid. Further, the nucleating agent is added within an extent not to provide ill effects to coating, preferably in a proportion of 0.01 wt. %–25 wt. % of the polymer liquid crystal, or 0.01 wt. %–10 wt. % of the total coating liquid.

The above coating of the solution may be effected by spin coating, dipping, or by using a wire bar, an applicator, or by printing such as the screen printing process.

The solution thus applied on the substrate is caused to stand at a liquid crystal temperature (80°–110° C.) for a prescribed time during the stage of evaporation of the solvent or after the evaporation to be formed into a polymer liquid crystal layer 212 in the state of a stable optical scattering film.

Now, the function of the nucleating agent is explained in some detail. Herein, the nucleating agent is a substance added in order to increase the number of crystal nucleic. As described above, when the polymer liquid crystal containing a nucleating agent is maintained at a liquid crystal temperature during or after the evaporation of the solvent therefor, crystal nucleic of the polymer liquid crystal is formed around the nucleating agent particles and then a crystal domain is formed around each crystal nucleus. As a result, the size of a crystal can be arbitrarily controlled by selecting the particle size, amount of addition and species of the nucleating agent. Accordingly, when the scattering state is formed, the degree of scattering is arbitrarily selected.

On the other hand, the optical scattering film formed in the above-described manner is transformed into an amorphous (isotropic) state 215 when it is heated to Tcl (clear point) or above of the polymer liquid crystal. The amorphous state is transparent to light as shown by an arrow in the figure. The transparent state is retained if the polymer liquid crystal is rapidly cooled to below the Tg (glass transition temperature) of the polymer liquid crystal after the heating.

Further, if the polymer liquid crystal film is heated to above Tcl and then held at a liquid crystal temperature followed by cooling, the scattering state 214 is again formed and fixed at a temperature below Tg. In this instance, the nucleating agent provides an enhanced scattering state and promotes crystal growth to accelerate the formation of the scattering state.

Examples of the nucleating agent may include, in addition to the above-mentioned titanium oxide, sodium 2,2-methylene-bis(2,6-di-tert-butylphenyl) phosphate (MARK NA-11 (trade name), available from Adeka Argus Kagaku K.K.) of the formula:

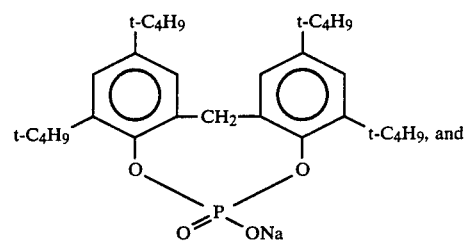

sodium bis(4-tert-butylphenyl)phosphate (MARK NA-10 (trade name), available from Adeka Argus Kagaku K.K.) of the formula:

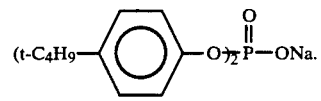

This type of nucleating agent is dissolved together with the polymer liquid crystal in a solution. When the mixture of the polymer liquid crystal and the nucleating agent is held at a liquid crystal temperature for a prescribed period in the course of or after the evaporation of the solvent, the nucleating agent is first precipitated, and then crystal nuclei of the polymer liquid crystal are formed around the nucleating agent to form crystal domains.

Because the nucleating agent is precipitated prior to the polymer liquid crystal, it is preferred that the nucleating agent is dissolved at a temperature higher than Tg, particularly higher than Tc, of the polymer liquid crystal.

Figure 23:
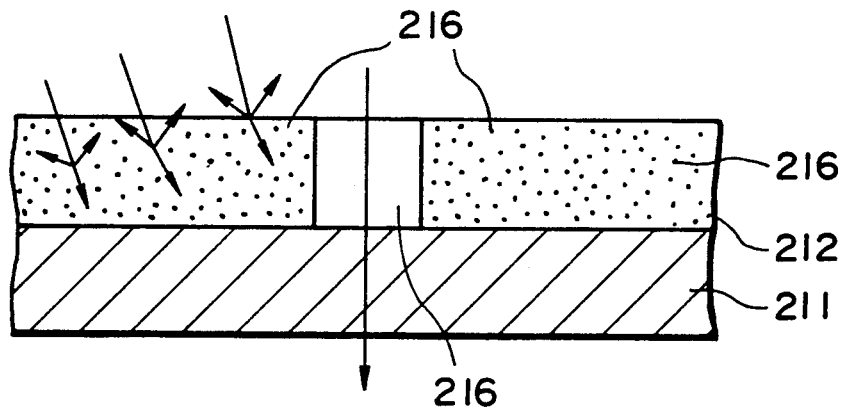

FIG. 23 is a schematic sectional view similar to the one shown in FIG. 22, wherein the reference numerals denote equivalent parts. An optical scattering film formed in this embodiment may be selectively formed into an amorphous state (a region 217 in the figure) or a scattering state (a region 216 in the figure). As the phosphate nucleating agent used in this embodiment is not light-scattering in the amorphous state to provide an increased transmittance leading to a higher contrast.

The nucleating agent can be other inorganic or organic fine particles in addition to the above-mentioned titanium oxide and specific phosphate salts. Phosphate salts are particularly preferred in general. Further, plural species of nucleating agents can be used in combination.

As described above, according to the present invention, a clear image can be formed at a sufficiently high contrast and in a stable memory state. Further, an image with a color of the backing member at a high density is formed against, e.g., a natural white color background without using polarizers, etc., conventionally used for providing an optical contrast.

Accordingly, the image thus found according to the present invention is expected to be used in a wide variety of field, for example, as a copy original for electrophotography.

Further, according to the present invention, there is provided a display apparatus or projection apparatus which is capable of forming a highly fine and clear color image free from color deviation or image deviation and is also capable of repetitively display and erasing color images or additional images.

What is claimed is:

1. An image display apparatus, comprising:
   a planar color filter comprising a plurality of color filter elements with at least two colors disposed in a layer, at least one surface of said layer being uncovered.
   an image forming medium having an image forming layer comprising a polymer liquid crystal capable of forming an image comprising a transparent part and an opaque part depending on a change of temperature thereof, at least one surface of the image forming layer being uncovered, and
   a moving means for moving the image forming medium relative to the color filter to a display position where the uncovered surface of the image forming layer and the uncovered surface of the layer of the color filter elements are opposite to each other with an air layer disposed therebetween.

2. An image display apparatus according to claim 1, wherein said image forming medium is in the form of an endless belt.

3. An image display apparatus according to claim 1, wherein the color filter includes a substrate covering one surface of the layer of color filter elements, and the image forming medium includes a substrate covering one surface of the image forming layer, whereby the substrate of the color filter, the layer of the color filter layer, the air layer, the image forming layer and the substrate of the image forming medium are disposed in this order in a direction perpendicular to the image forming layer at the display position.

4. An image display apparatus according to claim 1, wherein the color filter elements are in the form of color stripes disposed at a prescribed pitch, and the display apparatus includes a writing means for forming in the image forming layer an image comprising a transparent part and an opaque part corresponding to the color and pitch of the color stripes, and also an alignment means for detecting the transparent part in the image forming layer disposed with a prescribed positional relationship with a prescribed color stripe of the color filter at the display position to stop the movement of the image forming layer relative to the color filter.

5. An image display apparatus, comprising:
   a planar color filter comprising a plurality of color stripes with at least two colors disposed at a prescribed pitch,
   an image forming layer comprising a polymer liquid crystal capable of changing between states of transparency and opacity depending on a change of temperature thereof,
   a writing means for forming in the image forming layer an image comprising a transparent part and an opaque part corresponding to the color and pitch of the color stripes,
   a moving means for moving the image forming layer to a display position where the image forming layer is superposed with the planar color filter, and
   an alignment means for detecting the transparent part in the image forming layer disposed with a prescribed positional relationship with a prescribed color stripe of the color filter at the display position to stop the movement of the image forming layer relative to the color filter,
   thereby to display a color image formed by superposition of the image comprising the transparent part and the opaque part and the colored filter in alignment with each other at the display position.

6. An image display apparatus according to claim 5, wherein said writing means comprises a thermal head.

7. An image display apparatus according to claim 5, wherein said writing means comprises a semiconductor laser.

8. An image display apparatus according to claim 5, wherein said image forming layer is in the form of an endless belt.

9. An image display apparatus according to claim 5, which further comprises an erasure means for heating the image forming layer and holding the image forming layer at a prescribed temperature to form an opaque state.

10. An image forming apparatus according to claim 5, wherein said planar color filter comprises a layer of the color stripes with at least one surface thereof uncovered, said image forming layer has at least one surface uncovered, and the color filter and the image forming layer are superposed with each other so that the uncovered surface of the layer of the color stripes and the uncovered surface of the image forming layer are opposite to each other with an air layer disposed therebetween at the display position.

* * * * *

UNITED STATES PATENT AND TRADEMARK OFFICE
CERTIFICATE OF CORRECTION

PATENT NO. : 5,059,000
DATED : October 22, 1991
INVENTOR(S) : SHUZO KANEKO, ET AL.

It is certified that error appears in the above-identified patent and that said Letters Patent is hereby corrected as shown below: On the Title page, item [57] ABSTRACT Line 3, "pattened" should read --patterned--.

COLUMN 1

Line 5, "continuation-in-part" should read --continuation--.

COLUMN 3

Line 59, "crystal" should read --crystals--.

COLUMN 5

Line 29, "1a" should read --(1a)--.
   Line 47, "curve  1b" should read --curve (1b)--.
   Line 54, "curves ," should read --curves (2),--.
   Line 64, "renge." should read --range.--.

COLUMN 6

Line 3, "above mentioned" should read --above-mentioned--.
   Line 42, "electro conductivity." should read --electroconductivity.--.
   Line 49, "planer" should read --planar--.

COLUMN 7

Line 17, "thermal head 13" should read --thermal head 11--.

COLUMN 8

Line 68, "ditto)." should read --ditto) for R.--.

UNITED STATES PATENT AND TRADEMARK OFFICE
CERTIFICATE OF CORRECTION

Page 2 of 3

PATENT NO. : 5,059,000
DATED : October 22, 1991
INVENTOR(S) : SHUZO KANEKO, ET AL.

It is certified that error appears in the above-identified patent and that said Letters Patent is hereby corrected as shown below:

COLUMN 9

Line 40, "heater 71" should read --heater 73--.

COLUMN 10

Line 62, "above men-" should read --above-men- --.

COLUMN 11

Line 32, "1-10 micron" should read --1-10 microns--.

COLUMN 13

Line 12, "now" should be deleted.
Line 60, "reasure" should read --erasure--.

COLUMN 14

Line 14, "raised" should read --described--.
Line 30, "heater 72" should read --heater 172--.
Line 32, "Then," should read --Now,--.

COLUMN 15

Line 54, "function" should read --functions--.

COLUMN 16

Line 18, "operation," should read --operations,--.

UNITED STATES PATENT AND TRADEMARK OFFICE
CERTIFICATE OF CORRECTION

PATENT NO. : 5,059,000
DATED : October 22, 1991
INVENTOR(S) : SHUZO KANEKO, ET AL.

It is certified that error appears in the above-identified patent and that said Letters Patent is hereby corrected as shown below:

COLUMN 17

Line 62, "nucleic." should read --nuclei.--.
Line 65, "nucleic" should read --nuclei--.

COLUMN 19

Line 16, "found" should read --formed--.
Line 18, "field," should read --fields,--.
Line 24, "display" should read --displaying--.
Line 31, "uncovered." should read --uncovered,--.
Line 53, "layer," (first occurrence) should read --elements,--.

COLUMN 20

Line 33, "colored filter" should read --color filter--.

Signed and Sealed this

Fifteenth Day of June, 1993

Attest:

MICHAEL K. KIRK

Attesting Officer

Acting Commissioner of Patents and Trademarks